(12) United States Patent
Awad et al.

(10) Patent No.: US 8,996,014 B2
(45) Date of Patent: Mar. 31, 2015

(54) NETWORK ELEMENT, INTEGRATED CIRCUIT, CELLULAR COMMUNICATION SYSTEM AND METHOD FOR CORRELATING INFORMATION

(71) Applicant: IP.Access Ltd., Cambourne (GB)

(72) Inventors: Akram Jamal Masoud Awad, Cambridge (GB); Harrow James Edward Brereton, Cambridge (GB)

(73) Assignee: IP.Access Limited, Cambourne, Cambridge (GB)

( * ) Notice: Subject to any disclaimer, the term of this patent is extended or adjusted under 35 U.S.C. 154(b) by 133 days.

(21) Appl. No.: 13/743,803

(22) Filed: Jan. 17, 2013

(65) Prior Publication Data
US 2013/0183983 A1    Jul. 18, 2013

(30) Foreign Application Priority Data

Jan. 17, 2012 (GB) .................................. 1200709.2
Dec. 10, 2012 (GB) .................................. 1222146.1

(51) Int. Cl.
*H04W 36/00* (2009.01)
*H04W 24/02* (2009.01)

(52) U.S. Cl.
CPC .......... *H04W 36/0061* (2013.01); *H04W 24/02* (2013.01); *H04W 36/0083* (2013.01)
USPC ........................... 455/438; 455/444; 455/466

(58) Field of Classification Search
CPC ............ H04W 24/02; H04W 36/0083; H04W 36/0061
USPC .......................................... 455/438, 444, 446
See application file for complete search history.

(56) References Cited

U.S. PATENT DOCUMENTS

| | | |
|---|---|---|
| 2005/0160179 A1 | 7/2005 | Retana et al. |
| 2009/0117897 A1 | 5/2009 | Israelsson et al. |
| 2010/0093354 A1* | 4/2010 | Agashe et al. ................ 455/436 |
| 2012/0113862 A1* | 5/2012 | Santhanam et al. .......... 370/254 |
| 2013/0286851 A1* | 10/2013 | Moser et al. ............... 370/241.1 |

FOREIGN PATENT DOCUMENTS

KR      20020043514       6/2002

OTHER PUBLICATIONS

Combined Search and Examination Report Dated May 28, 2013 cited in British Patent Application No. GB1222146.1.

* cited by examiner

*Primary Examiner* — Chuong A Ngo
(74) *Attorney, Agent, or Firm* — Fitch Even Tabin & Flannery LLP

(57) ABSTRACT

A network element for a wireless communication system that supports a plurality of access points providing communication in small cells is described. The network element comprises a signal processor arranged to: receive and process information from a plurality of access points wherein the received information identifies a macro cell visible to a respective access point; and calculate a degree of correlation of the information from the at least two access points based at least partly on the processed macro cell information provided by the respective access point.

19 Claims, 9 Drawing Sheets

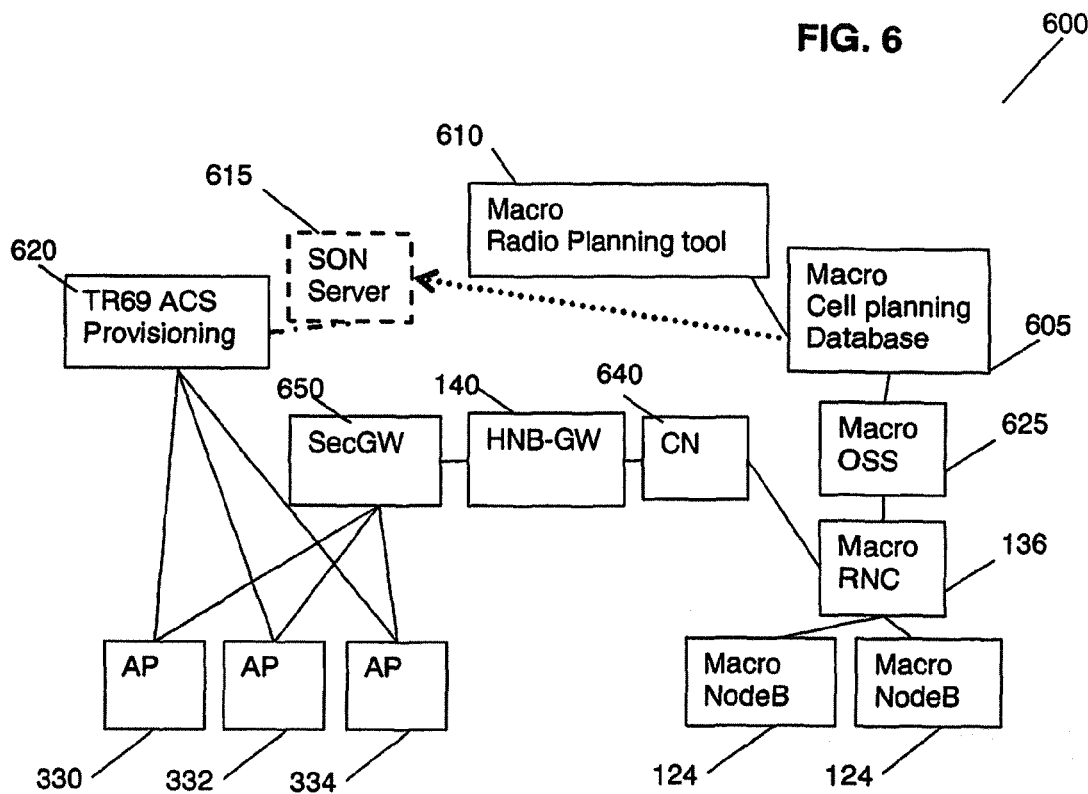
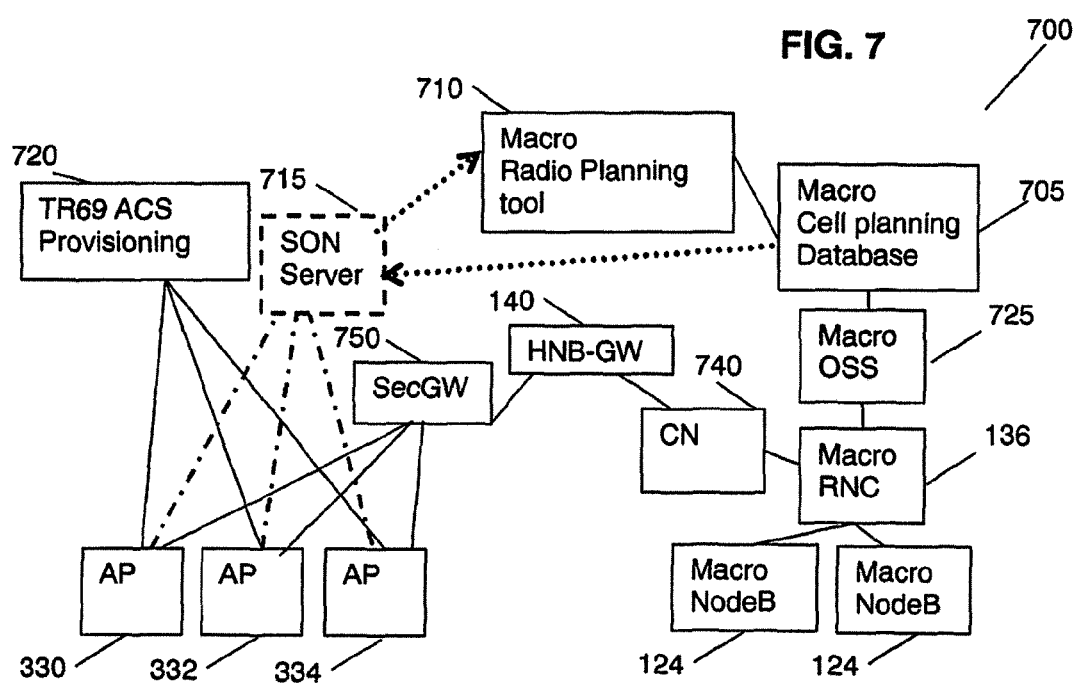

NETWORK ELEMENT, INTEGRATED CIRCUIT, CELLULAR COMMUNICATION SYSTEM AND METHOD FOR CORRELATING INFORMATION

CROSS REFERENCE TO A RELATED APPLICATION

This application claims priority to Great Britain Patent Application No. 1222146.1 filed Dec. 10, 2012, which claims priority from a provisional Great Britain Application No. 1200709.2, filed Jan. 17, 2012, both of which are incorporated by reference herein in their entirety.

FIELD OF THE INVENTION

The field of this invention relates to a network element, an integrated circuit, a cellular communication system and a method therefor. The invention is applicable to, but not limited to, a network element, integrated circuit and method to identify correlation between small cells and re-use shared information for parameter configuration, performance monitoring and/or network optimisation.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS™), developed by the $3^{rd}$ Generation Partnership Project (3GPP™) (www.3gpp.org). The $3^{rd}$ generation of wireless communications has generally been developed to support macro-cell mobile phone communications. Such macro cells utilise high power base stations (NodeBs in 3GPP™ parlance) in order to communicate with wireless communication units within a relatively large geographical coverage area. Typically, wireless communication units, or User Equipment (UEs) as they are often referred to in 3G parlance, communicate with a Core Network (CN) of the 3 G communication system via a Radio Network Subsystem (RNS). A wireless cellular communication system typically comprises a plurality of radio network subsystems, each radio network subsystem comprising one or more (coverage) cells to which UEs may 'attach', and thereby connect to the network. Each macro-cellular RNS further comprises a controller, in a form of a Radio Network Controller (RNC), operably coupled to the one or more Node Bs, via a so-called Iub interface.

Lower power (and therefore smaller coverage area) femto cells (or pico-cells) are a recent development within the field of wireless cellular communication systems. Femto cells or pico-cells (with the term femto cells being used hereafter to encompass pico-cells or similar) are effectively communication coverage areas supported by low power base stations (otherwise referred to as Access Points (APs) of Home Node B's (HNBs)). These femto cells are intended to be able to be piggy-backed onto the more widely used macro-cellular network and support communications to UEs in a restricted, for example 'in-building', environment.

Typical applications for such femto APs/HNBs include, by way of example, residential and commercial (e.g. office) locations, communication 'hotspots', etc., whereby APs/HNBs can be connected to a core network via, for example, the Internet using a broadband connection or the like. In this manner, femto cells can be provided in a simple, scalable deployment in specific in-building locations where, for example, UEs may come into close proximity to a femto AP/HNB. Thus, femto APs/HNBs are intended to enhance the coverage of a UMTS™ Radio Access Network (RAN) within residential and/or private commercial environments, and it is planned that the number of femto HNBs in a macro cell may number thousands.

If required, the location of an AP is typically measured using a GPS module that is part of the AP. In a femto cell network it is known that there may be a very large number of femto cells compared to the number of macro cells, with femto cells often residing within or overlapping with macro cells in the same geographic area. Thus, the coverage area of a single macro cell will inevitably overlap (and encompass) a coverage area of a large number of femto cells. Both macro cells and femto cells need to be configured with their individual cell parameters and optimised to balance the operators overall network performance. Individual macro cells which cover a larger population area are carefully configured, tuned and monitored using 'drive tests' and network performance measurements. Drive-testing and analysis of the results of the individual macro-cells is an expensive and time-consuming activity. Furthermore the drive tests are typically performed from inside a vehicle travelling on roads. The RF environment of a macro cell is usually defined by the measurements collected in drive test campaigns. Information about the RF environment of a macro cell is also reported in the measurement messages sent by UEs. However, femto cell APs tend not to be optimised on an individual basis due to their sheer number. APs must perform their own parameter optimisations (and are so called 'Self optimising').

One such configuration is the neighbour cell list. Traditionally in femto cells these are statically configured via O&M or use techniques such as Radio Environment Monitoring (REM) or network listen (NWL) to detect macro cells automatically and/or to determine the AP's own operational parameters. Additionally APs are capable of capturing other logs and performance measurements (such as call drop rates, handover attempts, voice quality related parameters, data throughput parameters as just some examples). Users typically spend their time indoors inside buildings and as such measuring the coverage of the macro cells inside a building requires 'walk-testing' which is even more costly to cover an area. Also, due to the placement of the AP indoors there is a chance that the AP cannot detect all of the available NCells outside whereas the UE (which is mobile) may find additional NCells. In WCDMA 3GPP the UE is only able to report the Frequency and Scrambling code of cells it detects over the air. In order to use this cell for handover, the AP must know its CellID as well so that it can inform the core network of this.

To obtain the CellID the small cell subsystem generally requires costly integration with other parts of the network such as the macro cell OA&M system. Typically the components of the Cell Planning tools, provisioning systems are developed by different vendors and as such agreeing APIs and overcoming inter-operational issues is costly. In addition keeping cell planning databases accurate and up to date provides the operator with an operational cost (OPEX) to maintain this information.

In an alternative aspect, in a macro cell environment, a Network Operator usually tries to include as many overlapping cells as possible in the neighbour list of a NodeB sector (although there can be exceptions where the maximum possible size of the neighbour list might be reduced). This is mainly driven by the micro-diversity advantage of soft handover in a WCDMA system. The larger the active set of a UE connection the less likely a connection will be lost or severely affected when the connection with one member of the active set is lost or degraded.

Macro cell neighbours are typically planned using static planning tools which use empirical propagation models to simulate the coverage characteristics of the cells and rank neighbour cells based on the probability of overlapping with a source cell. Although ranking is typically generated by the planning tools it is usually not a critical element in the neighbour planning process unless the number of overlapping cells exceeds the maximum neighbour list capacity.

Moreover, neighbour lists can go through rounds of optimisation which include collecting drive test measurements to identify missing neighbours and, to lesser extent, unneeded neighbours. Some vendors offer the capability of collecting and post-processing UE measurements in real time or through an offline optimisation process to identify missing or unneeded neighbours.

Missing neighbours of macro cells are typically added to the macro cell neighbour cell lists as normal neighbours for there is no need to differentiate between them and existing neighbours except in situations where the addition of missing neighbours may result in exceeding the neighbour list maximum capacity in which case neighbours are typically prioritised based on overlapping statistics (predicted through simulations and/or measured through drive tests or UE reports).

Information used in the macro cell neighbour planning or optimisation (simulated or measured) typically only applies to the corresponding cell due to the lack of correlation between macro cells.

Femto cells on the other hand do not use soft handover but rather hard handover. This is true for at least the vast majority of currently deployed femto cells (residential or enterprise). Handout from femto to macro is supported, whereas hand-in from macro to femto often isn't supported. It is therefore critical for a femto cell to have its neighbour cell list reliably configured to reduce the risk of a call drop during or after a handover. If some form of neighbour list optimisation is introduced to the femto cell to find missing neighbours it can be risky to add those neighbours directly and permanently to the neighbour list as the addition of an unreliable neighbour can result in increasing the call drop rate on the femto cell or the target macro cell. Assessing the reliability of potential neighbours might therefore include configuring the UEs to report measurements on those neighbours without initiating handovers to them. This will add an additional burden on the UE especially if handover speedup is critical for the survival of a connection. Some mechanism to prioritise those potential neighbours for the purpose of including them in the assessment is required in order to avoid wasting the UE's resources and time in assessing potential neighbours that are more likely to be unreliable.

Moreover, due to the nature of the femto cell environment where one or more indoor barriers can exist a sudden change in the RF environment is very likely and the femto cell may be required to react quickly to that change by initiating a handover to another cell. One factor that can affect the speed of the UE's reporting of neighbour measurements is the number of neighbours included in the measurement control messages by the cell. It is therefore important that the femto cell optimises the size of its neighbour list to avoid lengthy measurement processes by the UEs.

Due to the correlation that might exist in the RF environments of femto cells within close vicinity of one another, information measured or reported by a femto cell can be relevant in the neighbour optimisation process of the other surrounding femto cells.

SUMMARY OF THE INVENTION

Accordingly, the invention seeks to mitigate, alleviate or eliminate one or more of the above mentioned disadvantages, either singly or in any combination. Aspects of the invention provide a network element, an integrated circuit a cellular communication system, a method and tangible computer product for provisioning communication units, as described in the appended claims.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 6 illustrates a first example Operations and Management (OAM) system interface.

FIG. 7 illustrates a first example Operations and Management (OAM) system interface.

DETAILED DESCRIPTION

Figure 1:
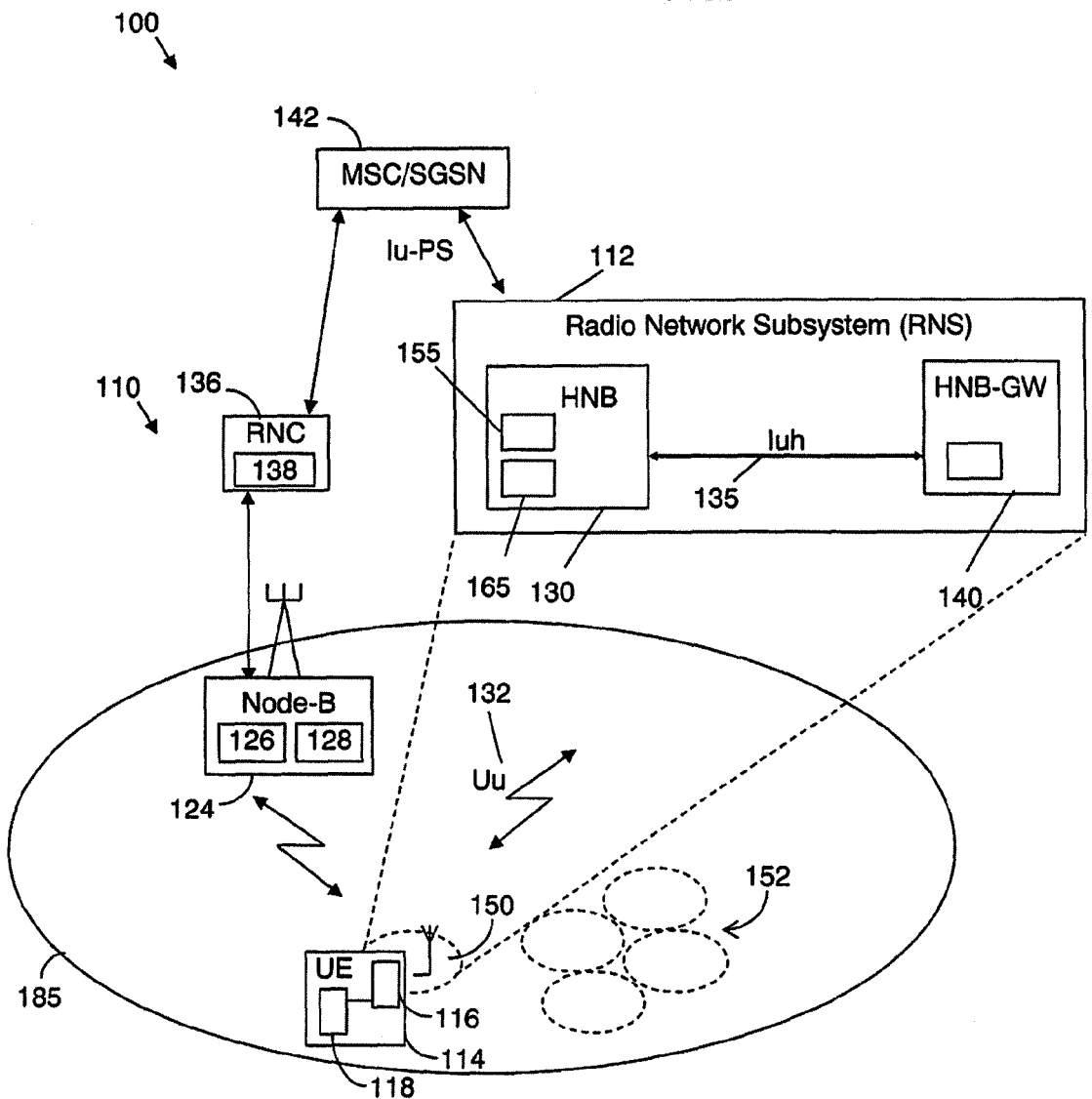
FIG. 1 illustrates an example of part of a cellular communication system.

Examples of the invention will be described in terms of a network element within a 3rd generation (3G) Radio Network Sub-system (RNS) for supporting one or more femto cells within a Universal Mobile Telecommunications System (UMTS™) cellular communication network. However, it will be appreciated by a skilled artisan that the inventive concept herein described may be embodied in any type of network element for supporting communications within a cellular communication network. In particular, it is contemplated that the inventive concept is not limited to being implemented within a network element for supporting one or more femto cells within a UMTS™ cellular communication network, but may be equally applied within one or more network element(s) adapted to support any type of communication cell, e.g. one or more macro cells, and/or adapted in accordance with alternative cellular communication technologies.

The technique proposed in this application provides a solution to the problem of known cell planning tools and provisioning systems being developed by different vendors requiring complex and costly APIs and overcoming inter-operational issues, as well as keeping cell planning databases accurate and up to date to provide the Network Operator with an operational cost (OPEX) to maintain this information.

In a second use of the invention: the configuration of some or all parameters of a cell assumes certain configurations and performance statistics on the surrounding macro cells and femto cells. The femto cells need to be aware of any changes to those configurations and statistics that might invalidate its current configuration (e.g. as a result of macro cell re-planning). Without this feature, another level of integration with the OSS and CMS of the operator will be required to alert the small cell subsystem about such changes.

In a third use of the invention: some femto cells are required to report their location (to satisfy RF spectrum regulations). In some cases the approximate location relative to other macro cells or APs is required (e.g. X meters away from cell A). If the location of the macro cells is available, this allows RF regulatory requirements to be met but may also help provide GPS assistance information to speed up the GPS lock time/allow GPS to lock. GPS is often used in femto Cells to provide accurate location information for E911 regulatory requirements. Due to APs being indoors, the GPS performance is often poor.

Examples of the invention may enable a better identification of surrounding small cells together with a degree of correlation with those cells (such as searching for common macro cell IDs). An example of the operation of searching for cell IDs is outlined in FIG. 5. This involves the 3GAP devices providing their Cell Results information to a central database which needs to include as a minimum set the PLMN ID, CellId, RNCID, Frequency, Scrambling code, CPICH RSCP, CPICH EcNo. The database will log these against the particular 3GAP Serial Number. In response the central database will perform a look up query to retrieve a list of other 3GAPs which have one or more matching CellId+RNC-ID+PLMN_id (as their unique key). Where the database finds additional NCells that are not in the cell results list passed to it, it will send these as candidate missing NCells.

Another example may be to use the known Latitude-Longitude address of the 3GAP (since many 3GAPs are equipped with GPS or similar location capabilities), in order to find other 3GAPs within a configurable range of the 3GAP that has pushed its results to the centralised server. A database may then find other 3GAPs (by their logged location) within the local vicinity and collate a list of detected macro cells from this list of 3GAPs and their associated parameters (e.g. CellId, Frequency and Scrambling code). This may be useful for 3GAPs that cannot detect any macro cells using NWL due to their position indoors where the UE just outside the building may be able to successfully hand out to it.

A yet further advantage provided by some examples may be obtaining information about other network layers (e.g. the macro cell layer) without a need to request or access such information from the operator's OA&M systems. Additionally, examples of the invention may potentially provide a mechanism to standardise this information base to allow different AP vendors to share information.

Referring now to the drawings, and in particular FIG. 1, a simplified example of part of a cellular communication system is illustrated and indicated generally at 100. In FIG. 1, there is illustrated an example of a communication system in a form of a third generation partnership project (3GPP™) Universal Mobile Telecommunication System (UMTS™) network 100 that comprises a combination of a macro cell 185 and a plurality of femto cells 150, 152. For the example embodiment illustrated in FIG. 1, radio network sub-systems (RNSs) comprise two distinct architectures to handle the respective macro cell and femto cell communications.

In the macro cell scenario, the RNS 110 comprises a controller in a form of a Radio Network Controller (RNC) 136 having, inter alia, one or more signal processing module(s) 138. The RNC 136 is operably coupled to at least one NodeB 124 for supporting communications within the macro cell 185. The NodeB 124 comprises signal processing module 126 and transceiver circuitry 128 arranged to enable communication with one or more wireless communication units located within the general vicinity of the macro communication cell 185, such as User Equipment (UE) 114. The RNC 136 is further operably coupled to a core network element 142, such as a serving general packet radio system (GPRS) support node (SGSN) and/or a mobile switching centre (MSC).

In a femto cell scenario, an RNS 112 comprises an access point, 130, also known as a Home NodeB (HNB), that is arranged to perform a number of functions generally associated with a cellular communication base station, and a controller in a form of a Home NodeB Gateway (HNB-GW) 140. As previously mentioned, in some example embodiments, the number of femto HNBs in a single macro cell may number a few or tens of thousands. As will be appreciated by a skilled artisan, an HNB is a communication element that supports communications within a communication cell, such as a femto cell 150, and as such may provide access to a cellular communication network via the femto cell 150. One envisaged application is that an HNB 130 may be purchased by a member of the public and installed in their home. The HNB 130 may then be connected to an HNB-GW 140 via an Iuh interface 135, for example implemented over, say, the owner's broadband internet connection (not shown).

Thus, an HNB 130 may be considered as encompassing a scalable, multi-channel, two-way communication device that may be provided within, say, residential and commercial (e.g. office) locations, communication 'hotspots' etc., to extend or improve upon network coverage within those locations. An example of a typical third generation (3G) HNB for use within a 3GPP™ system may comprise some NodeB functionality and some aspects of radio network controller (RNC) 136 functionality. For the illustrated example embodiment, the HNB 130 comprises signal processing module 165 and transceiver circuitry 155 arranged to enable communication with one or more wireless communication units located within the general vicinity of the femto communication cell 150, such as User Equipment (UE) 114, via a wireless interface (Uu) 132.

The 3G HNB-GW 140 may be coupled to the core network (CN) 142 via an Iu interface, such as the packet switched Iu interface, Iu-PS, as shown. In this manner, the HNB 130 is able to provide voice and data services to a cellular handset, such as UE 114, in a femto cell, in the same way as a conventional NodeB would in a macro cell, but with the deployment simplicity of, for example, a Wireless Local Area Network (WLAN) access point.

The example cellular communication system 100 illustrated in FIG. 1, may comprise one or more network elements for supporting communication within one or more cells of the communication system 100, such as the femto HNB 130.

In accordance with some example embodiments of the present invention, a signal processing module within network element, such as signal processor 165 of HNB 130 of FIG. 1, is arranged to:

(i) In one example embodiment, the correlation between two APs can be identified by the sharing of one or more measured macro cells in NWL and/or by their UEs. The RF measurement values can be used to identify APs which are at the cell edge of the macro cell and are therefore more likely to have unreliable macro cell information for the use of the surrounding APs. The number of overlapping macro cells between the APs as well the strength of the signals reported by the APs can be used to indicate the level of correlation between the AP pairs.

(ii) In one example embodiment, the reported locations of the APs can be used to identify correlated APs. The calculated distance and the source of location (e.g. GPS, approximation) can be used to indicate the level of correlation between the AP pairs.

(iii) Multiple correlation identification and measurement methods such as the above can be combined with different weights to calculate an overall degree of correlation between the AP pairs.

(iv) In one example embodiment, when a UE reports the scrambling code and frequency of a detected neighbour cell the AP can obtain the cell's identification information from the correlated APs' information if available. In the case of conflicting information from the correlated APs (e.g. different macro cells with the same SC/URFCN info), a deterministic or probabilistic approach can be used to decide on the most suitable selection of information taking into account the degree of correlation with the different APs and the measured signal strengths and qualities as reported by the requesting AP and the surrounding APs.

(v) In one example embodiment, the coverage information of a macro cell as reported by surrounding APs can be used to calculate the probability of the macro cell coverage at the location or in the area surrounding the requesting AP. The degree of correlation with the different surrounding APs can be used to weigh the RF measurements from the different APs when combining or filtering them to build the coverage map. One use of such coverage map is the determination of a macro cell to be a good neighbour before adding it temporarily or permanently to the requesting AP's neighbour list. An application to this in ANR is the prioritisation of neighbours' neighbours before including them to the UE measurement configuration messages as potential neighbours for initial assessment.

(vi) In one example embodiment, the location of correlated APs as well as information reported about their neighbour cells such as signal strength, signal quality and timing advance can be used to estimate the coarse location of the requesting AP by combining that information with the equivalent information about the macro cells as measured by the requesting AP and/or its UEs. The degree of correlation with the surrounding APs can be used to weigh the reported information of the APs when combining or filtering them to estimate the location.

(vii) In one example embodiment, a change in the SIB messages of the macro cell as measured by one or more of the surrounding small cells can trigger an alarm to a correlated AP to inform it of the change in the macro cell configuration. One application for this is the ability to optimise NWL functionality so that less frequent NWL cycles need to be performed by the individual APs (i.e. only run NWL when a change alarm is received).

(viii) In one example embodiment, an AP that is historically least likely to have active users in a given hour (e.g. peak hour) can be taken to NWL mode to update the broadcast and load information of the macro cells and then update correlated APs with the new information without the need for all correlated APs to go into NWL mode to obtain this information.

(ix) In one example embodiment, a change in one or more performance metrics of the macro cell as reported by a signal processing module 165 of one or more surrounding APs can be used to alarm the correlated APs about this change as a potential indicator of change in the macro cell network. The degrees of correlation between the APs can be used to weigh the reliability of the alarm in this case. One application for this is for an AP to avoid including a macro cell in the UE measurement configuration messages of a new connection if correlated APs with existing or recent connections experienced a surge in call drop rate with that macro cell.

This invention may require minor changes to the 3GAP to export the detected cell results in a different format, but typically would be using existing provisioning protocols such as TR69.

However the logic of the database look-up may be required operationally to be on a new server (separate to the provisioning system) due to cost of development and integration of a new feature onto existing provisioning systems. As such changes to the 3GAP may be required to allow a second interface to a new self-organising network (SON) server. This would then help reduce the development costs of the new SON server and integration into existing provisioning systems.

Figure 2:
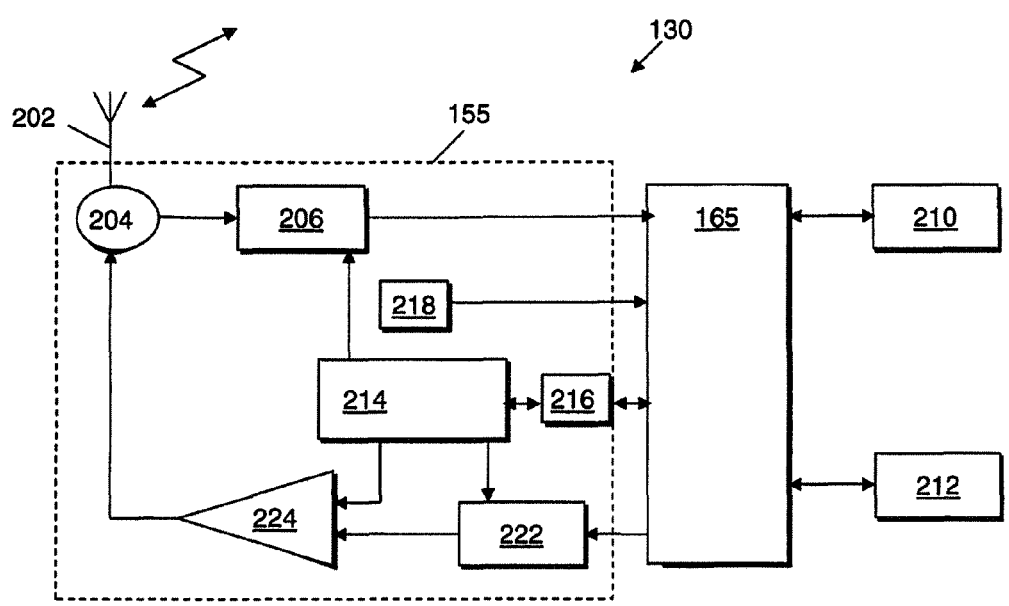
FIG. 2 illustrates an example of a simplified block diagram of a communication unit adapted to provision a communication unit within a communication system with a frequency and scrambling code pair.

Referring now to FIG. 2 for completeness, an example of a simplified block diagram of a femto HNB 130 is shown. The example femto HNB 130 contains an antenna 202 coupled to the transceiver circuitry 155. More specifically for the illustrated example, the antenna 202 is preferably coupled to a duplex filter or antenna switch 204 that provides isolation between receive and transmit chains within the femto HNB 130.

The receiver chain, as known in the art, includes receiver front-end circuitry 206 (effectively providing reception, filtering and intermediate or base-band frequency conversion). The front-end circuitry 206 is serially coupled to the signal processing module 165. An output from the signal processing module 165 is provided to a transmit element of a network connection 210, for example operably coupling the signal processing module 165 to the HNB-GW 140 of FIG. 1 via, say, the Internet (not shown). The controller 214 is also coupled to the receiver front-end circuitry 206 and the signal processing module 165 (typically realised by a digital signal processor (DSP)). The controller 214 and signal processing module 165 are also coupled to at least one memory device 216 that selectively stores operating regimes, such as decoding/encoding functions, synchronisation patterns, code sequences, event measurement report data and the like.

As regards the transmit chain, this essentially includes a receiving element of a network connection 210, coupled in series through transmitter/modulation circuitry 222 and a power amplifier 224 to the antenna 202. The transmitter/modulation circuitry 222 and the power amplifier 224 are operationally responsive to the controller 214, and as such are used in transmitting data to a wireless communication unit, such as UE 118.

The signal processor module 165 in the transmit chain may be implemented as distinct from the processor function in the receive chain. Alternatively, a single processor may be used to implement processing of both transmit and receive signals, as shown in FIG. 2. Clearly, the various components within the femto HNB 130 can be realised in discrete or integrated component form, with an ultimate structure therefore being merely an application-specific or design selection.

In accordance with examples of the invention, the memory device 216 stores computer-readable code thereon for programming the signal processing module 165 to perform a method for enabling a reduction in inter-cell interference within a cellular communication system.

Small cells report specific types of information to a centralised unit within the small cell subsystem (e.g. OAM or HNBGW or a new system entity). The reported information types may be pre-determined or requested on demand. Reported information by small cells for this innovation can fall into two main categories:

a. Information to identify surrounding small cells and calculate the degree of correlation between two small cells, such as Measured Location of the small cell, logged location of the small cell to allow site visits/E911 call-outs' logged IPSec address so that direct 3GAP-3GAP messages could be sent to each-other', Cell IDs of neighbouring cells, and distance or timing advance information with neighbouring cells b. Information that can be reused by other surrounding small cells based on the degree of correlation between those cells, such as one or more of the above examples, details of neighbouring cells, coverage information on neighbouring cells, performance statistics on neighbouring cells.

A processor (not shown) in the centralised unit then processes the small cell reported information from the first category to build a correlation matrix between every pair of small cells within its database. The centralised unit can use any deterministic or stochastic method to calculate the degree of correlation between every pair of small cells. The centralised unit can also use methods to speed up the correlation calculation process by assuming zero correlation between some pairs based on certain criteria to avoid prohibitive processing complexity, especially in deployments with large number of cells.

Depending on whether a centralised or distributed processing method is taken, the information from category (b) can be either stored in a centralised unit in the small system subsystem or in the individual small cells (e.g. information from surrounding cells with correlation degree above certain value). The reporting of category (b) information to the individual small cells in a distributed processing implementation can be through direct interfacing with surrounding cells or through a gateway. X2 and Iurh interfaces can be extended to allow for the exchange of this type of information between small cells.

Category (b) information can be reported by small cells periodically or on demand.

When a small cell needs information which can be extracted or calculated with assistance from surrounding cells, the relevant category (b) information are pulled or requested from the centralised storage unit or directly from the surrounding smalls above certain level of correlation with the requesting small cell. The information may then be filtered or combined by signal processing module 165 based on some criteria and then processed to deliver the requested information by the small cell.

The combining and filtering stages can weigh the information from the different surrounding cells based on their degree of correlation with the requesting small cell as a measure of confidence in the used information. A deterministic or stochastic method can be used in the filtering or combining of the information provided by the different surrounding cells. In this case, not all information is available for the calculation of the requested information the processing unit may apply different weights to the different inputs or may declare a failure to provide the info based on the criticality of the missing surrounding cell information.

Figure 3:
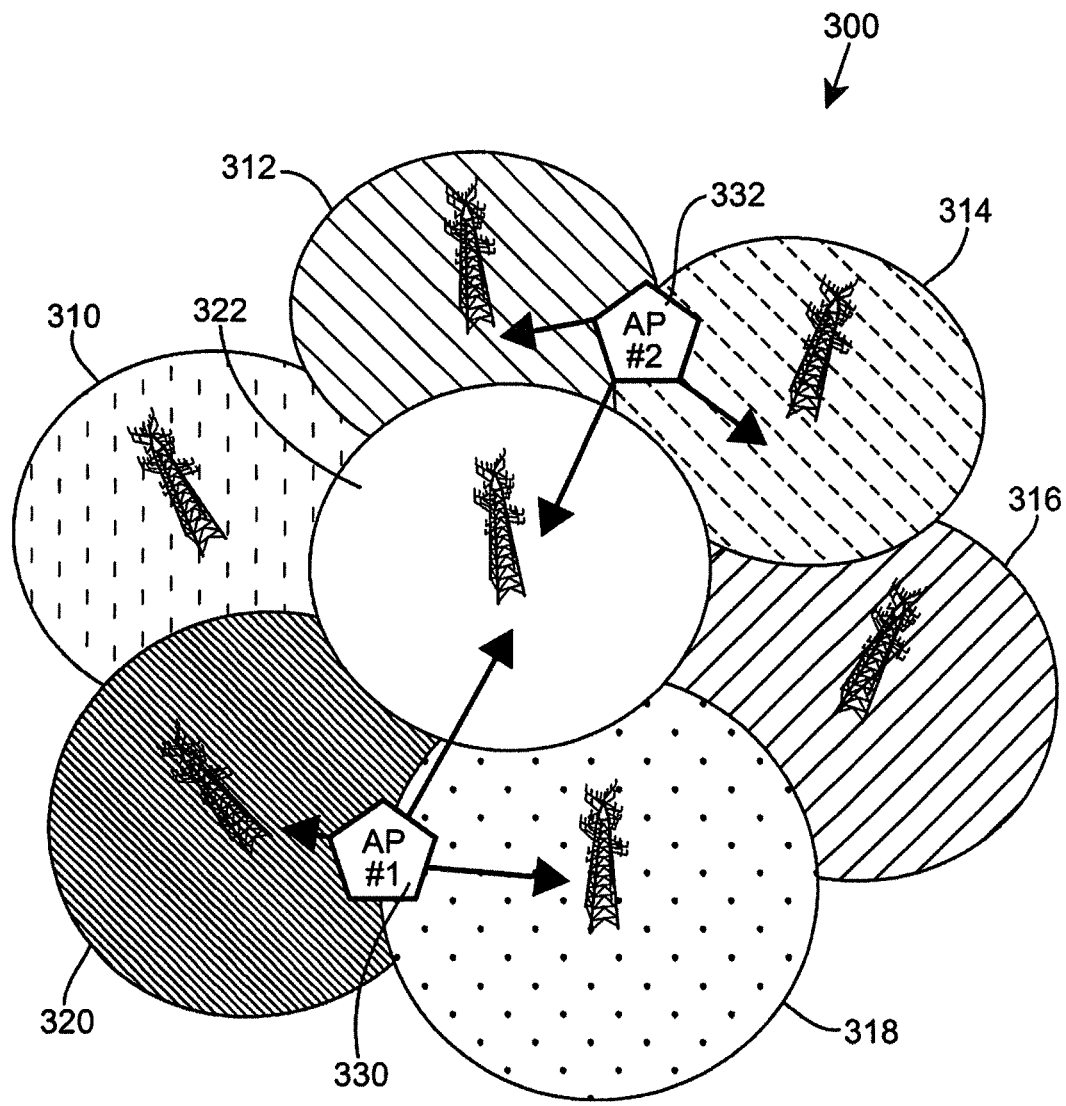
FIG. 3 illustrates an example of multiple APs sharing some of the same macro cells.

FIG. 3 illustrates an example 300 of multiple APs (two APs 330, 332 in this example) sharing some of the same macro cells 310-322 and thereby being at least in a position to inform each other of potential missing macro cells that they should add to their respective NCell lists.

Figure 4:
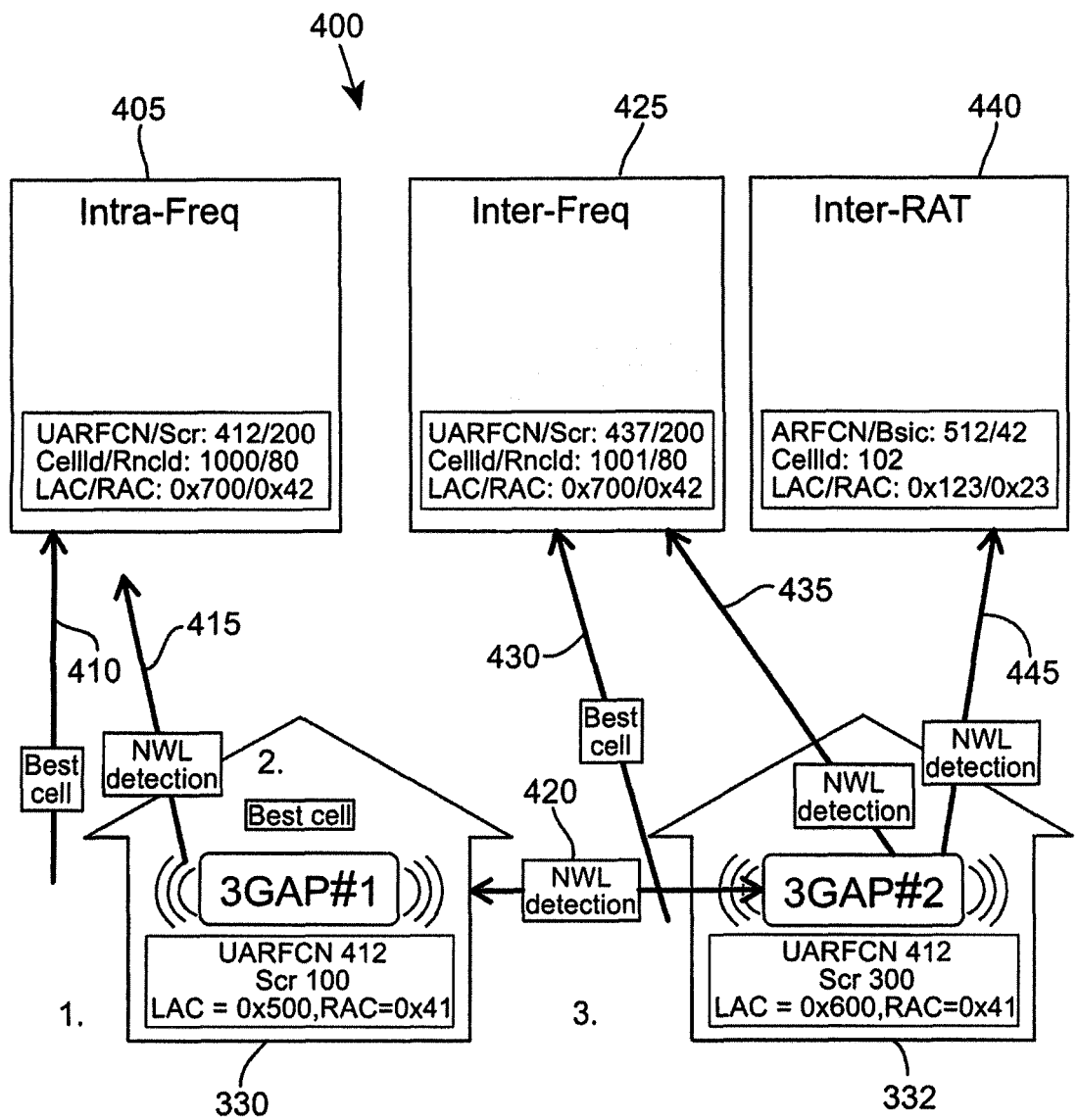
FIG. 4 illustrates an alternative example block diagram of multiple APs sharing some of the same macro cells.

Referring now to FIG. 4, a pictorial example 400 illustrates multiple APs (two APs 330, 332 in this example) sharing some of the same macro cells, for example in accordance with FIG. 3. In FIG. 4, a user equipment (UE) located external to a first building that employs a first AP 330. The UE selects its best macro cell 410 and uses the macro cell intra-frequency and scrambling code (UARFCN/Scr: 412/200) 405, as shown. When the UE transitions to being located inside the first building, the UE hands over communication to the first AP 330, based on NWL detection 415 of the macro cell by the first AP (namely 3GAP 330). When the UE moves outside the first building via an alternative (e.g. back) door, the UE would ordinarily be handed over to a second macro cell using Inter-RAT 440 and Inter-frequency 425 (UARFCN/Scr: 437/200) parameters.

However, in accordance with example embodiments of the invention, the first AP 330 (3GAP#1) does not have the second macro cell within its Ncell list. Hence, the UE would ordinarily try to use the first macro cell (with UARFCN/Scr: 412/200) 405. However, the signal from the first macro cell 405 may be a weak signal cell (at position 3), and as such the UE would need more power (thereby causing more interference) or worst case may cause a call drop. In accordance with example embodiments, and by employing one or more aspects of this invention, the server is configured to identify a relation between APs, based on information obtained from those APs, e.g. the first AP 330 (3GAP#1) may detect signals from the neighbouring (perhaps adjacent) building employing a second AP 332 (3GAP#2). The second AP 332 (3GAP#2) may be detected (say via NWL detection 420) by the signal processing module 165. The signal processing module 165 of the first AP 330 (3GAP#1) may then ask a central database (not shown) for a list of cells that the second AP 332 (3GAP#2) is able to listen to (via further NWL detection mechanisms 435, 445). Thus, in this manner, the first AP 330 (3GAP#1) must be provided with the details of the second Macro UARFCN/Scr: 437/200 (from the second AP 332 (3GAP#2)'s Ncell list) to use as its best available cell 430, otherwise handover to the macro cell is impossible.

In accordance with a further example embodiment, a cell may contain basic information of a detected neighbour (for example through either a UE measurement report or by reading neighbours' system information broadcast messages (SIB11 messages) in network listen (NWL) mode). Both of these two approaches will only provide the UARFCN and SC of the neighbour. The AP may then request the Cell ID of this neighbour from the SON server and the SON server will use information provided by other correlated APs in order to retrieve the cell ID of the neighbour (without the need to query it from other components of the network such as the network planning databases).

Thus, when employing examples of the invention, and prior to hand-out (as the UE moves from position 2 to position 3), the UE will detect Macro UARFCN/Scr: 437/200 as a better macro-cell than UARFCN/Scr: 412/200, since it is now in 3GAP#1's Ncell list.

Figure 5:
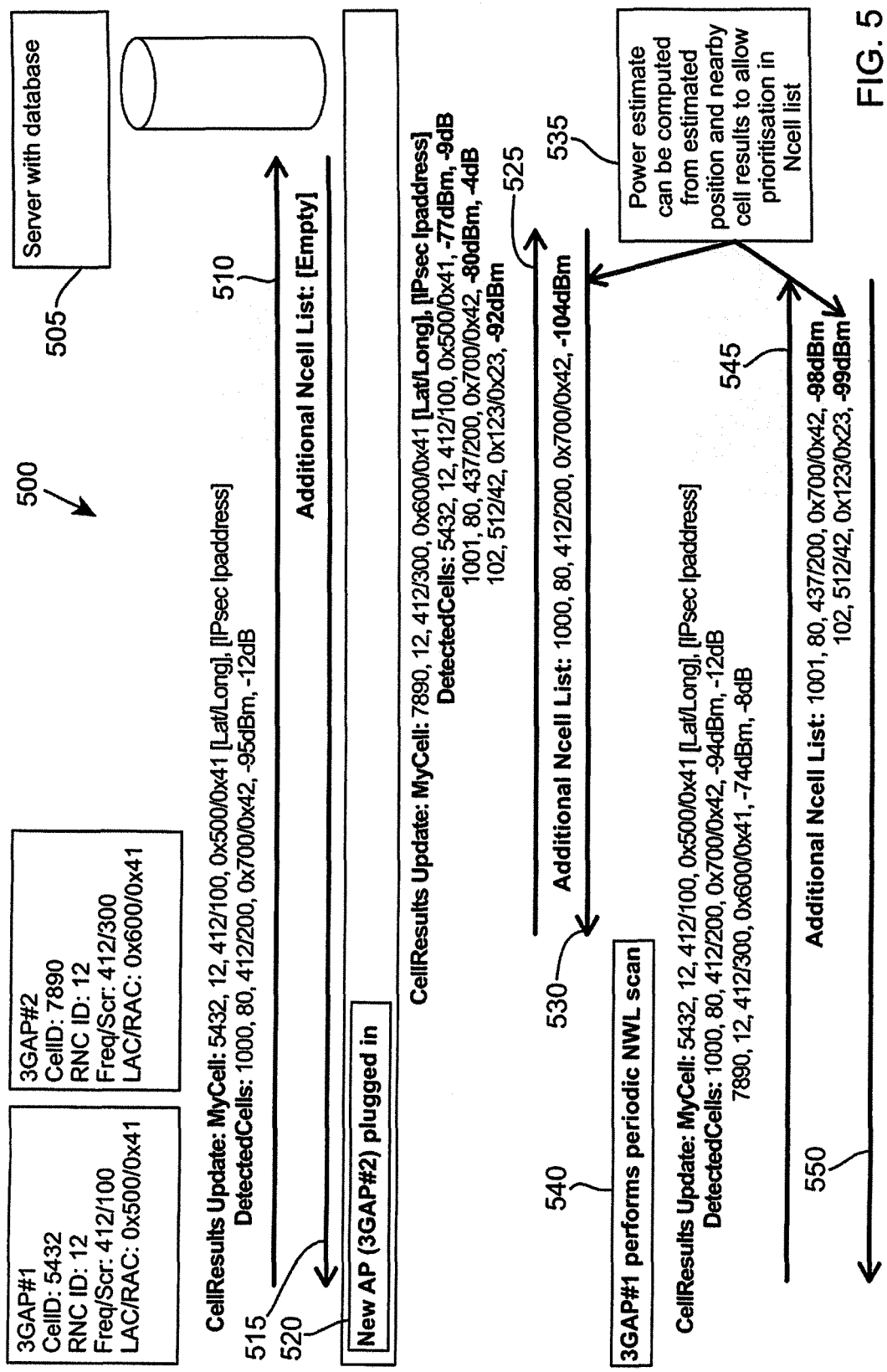
FIG. 5 illustrates an example protocol.

FIG. 5 illustrates an example protocol 500 employing aspects of the invention. The signal processing module 165 (and associated transmitter module) of the first AP 330 (3GAP#1) transmits a CellResults Update message 510 to a server comprising a database 505. The server comprising the database 505 returns an additional Ncell list message 515

(which is empty in this example). A (new) second AP 332 (3GAP#2) is then plugged in 520. The signal processing module 165 of the second AP 332 (3GAP#2) transmits its own CellResults Update message 525 to the server comprising the database 505. The server comprising the database 505 returns an additional Ncell list message 530 to second AP 332 (3GAP#2) (which comprises the Ncell list of the first AP 330 (3GAP#1) in this example).

In one example, the server may perform a power estimate 535, which may be computed from estimated positions of APs and nearby cell results in order to allow prioritisation of the respective Ncell lists.

Next, the signal processing module 165 first AP 330 (3GAP#1) performs a periodic NWL scan and reports an updated CellResults Update message 545 to the server comprising the database 505. Now, the server comprising the database 505 returns an additional Ncell list message 550 to first AP 330 (3GAP#1) (which comprises the Ncell list of the second AP 332 (3GAP#2) in this example).

FIG. 6 illustrates a first example Operations and Management (OAM) system interface 600. A macro cell radio planning function/processor 610 is operably coupled to a macro cell planning database 605 and arranged to perform macro cell system planning using information provided therefrom. The macro cell planning database 605 is operably coupled to a macro cell OSS 625, which is operably coupled to macro cell NodeBs 124 via a macro cell radio network controller (RNC) 136, as illustrated. As illustrated in FIG. 1, the macro cell RNC 136 is operably coupled to a femto cell network, and in particular to a HNB-GW 140 via a core network 640. The HNB-GW is operably coupled with a number of femto cell APs 330, 332, 334 via a SecGW processor/function 650. According to example embodiments, a SON server 615 receives information from the macro cell planning database 605 and provides a list of cell ID's, Latitude/Longitude information, UARFCN, Scrambling codes for macro cells to a TR69 auto configuration server (ACS) provisioning module 620. With the approach in FIG. 6 the SON Server 615 is introduced behind the TR69 ACS, which must exchange significant data through the TR69 ACS provisioning module 620 and extract data from the Macro Cell Planning database 605. In an alternative example, the SON Server 615 may be incorporated into the TR69 ACS provisioning module 620 itself.

FIG. 7 illustrates a second alternative example Operations and Management (OAM) system interface 700. A macro cell radio planning function/processor 710 is operably coupled to a macro cell planning database 705 and arranged to perform macro cell system planning using information provided therefrom. The macro cell planning database 705 is operably coupled to a macro cell OSS 725, which is operably coupled to macro cell NodeBs 124 via a macro cell radio network controller (RNC) 136, as illustrated. As illustrated in FIG. 1, the macro cell RNC 136 is operably coupled to a femto cell network, and in particular to a HNB-GW 140 via a core network 740. The HNB-GW is operably coupled with a number of femto cell APs 330, 332, 334 via a SecGW processor/function 750. According to example embodiments, a SON server 715 receives information from the macro cell planning database 705 and provides a list of cell ID's, Latitude/Longitude information, UARFCN, Scrambling codes for macro cells to a TR69 ACS provisioning module 720. In this example, the APs 330, 332, 334 can share cell results with a second SON Server (not shown), for example using TR69 as a protocol, or HTTP(S) that allows the integration effort with other components of the system to be minimised (thereby minimising development and integration costs).

In both of the approaches in FIG. 6 and FIG. 7, the interface from the Macro Cell Planning database 605, 705 may be optionally added to allow additional known macro cells to be added to AP's that cannot detect macro cells via NWL, but have a known location.

Similarly, in both of the approaches in FIG. 6 and FIG. 7, the interface to the Macro Cell Planning function/processor 610, 710 may be optionally added to allow data stored and decisions made by the SON server to be used in the planning and/or optimisation of the macro cell network.

In some examples, the SON Server 615, 715 may optionally provide 3GAP known radio frequency (RF) results to the Network Operators radio planning tools, e.g. macro radio planning 610, 710.

Figure 8:
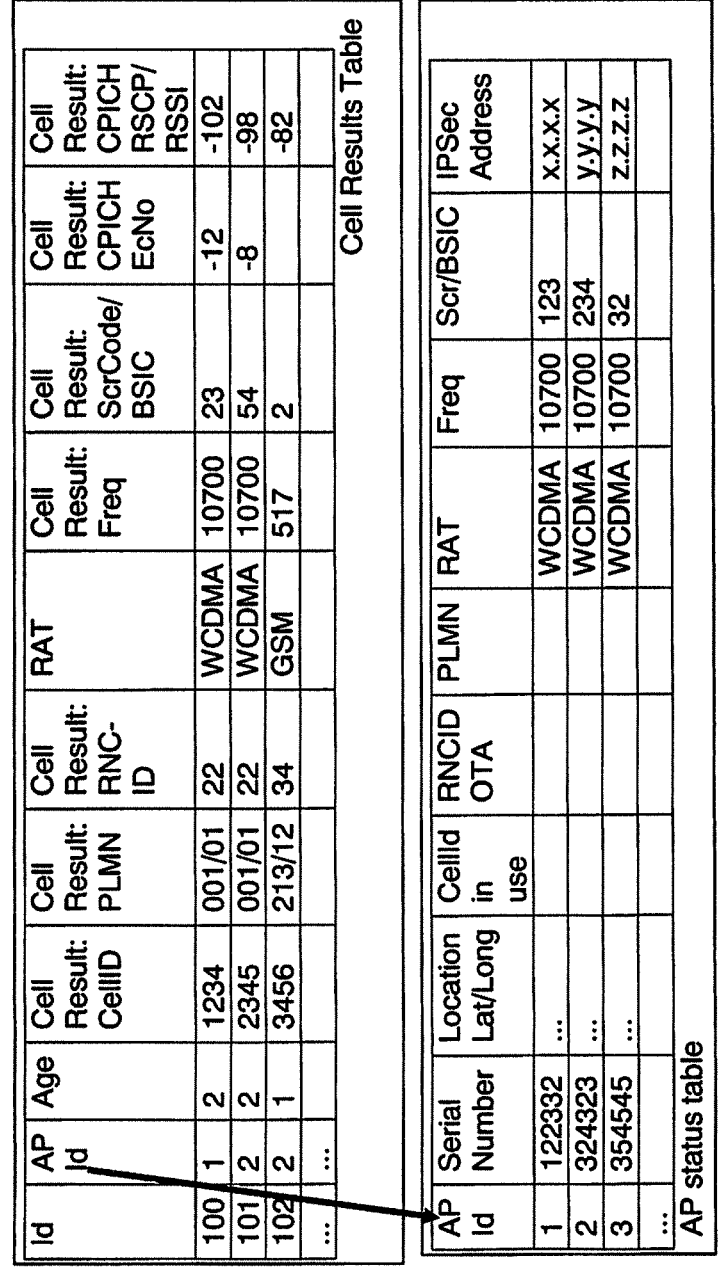
FIG. 8 illustrates one example SON Server lookup mechanism.

FIG. 8 illustrates one example SON Server lookup mechanism 800 comprising at least two exemplary tables 810, 820, namely a Cell Results Table and an AP Status Table. When an AP processes data in signal processing module 165 and sends its cell results to the SON server 615, 715, the signal processing module 165 of the AP 330, 332, 334 updates or adds the results to, say, the two tables, as illustrated in FIG. 8. If the 3GAP serial number is not already in the AP Status table 820, the 3GAP serial number may be added by the signal processing module 165. If the 3GAP serial number is already present then the record is updated by the signal processing module 165.

Similarly if the cell results for this AP 330, 332, 334 are already present in the cell results table 810 then they are updated by the signal processing module 165. If they are not present then they are added by the signal processing module 165. Optionally, in some examples, old results for this cell may be removed using the 'age' of the results (e.g. after two days of not reporting the cell result) by the signal processing module 165. This is to ensure that the cell results database does not end up with stale results. This also allows for occasions where a macro cell outage occurs or due to the fact that RF propagation changes due to meteorological affects (e.g. rain) mean the cell was not detected and avoids the premature loss of a valid cell.

Two approaches may be taken by the signal processing module 165 using the tables in FIG. 8, namely: Search by matching CellID-RNCID-PLMNID; and Search by Lat/Long:

In one example, a search by matching CellId-RNCID-PLMNID may comprise one or more of the following processes:

1. a search of the cell results table is performed to identify a list of AP ID which has matching CellID-RNCID-PLMNID.
2. This list of AP ID's is then used to retrieve a list of CellResults Ids
3. The CellResults ID list is used to extract a table of CellResult parameters.
4. Duplicate CellID-RNCID-PLMNID results are tagged as related results.
5. The CellResult parameters which have matching CellID-RNCID-PLMNID from the AP that sent up the query are removed from the list.
6. Optionally the tagged (as in step 5) cell Results may be further processed using RF pathloss formulas with known Lat/Long positions to compute an expected coverage level at the location of the AP in question
7. The resulting list of CellId-RNCID-PLMNID, Freq, Scr Code, expected coverage level for each of the cells is the returned to the 3GAP The Search by Latitude/Longitude may comprise a search of the AP Status table 820, which is performed to identify a list of AP IDs which are within a geographic (configurable) range of the 3GAP that has uploaded its results.

The steps (2-7) from above 'search by matching CellId-RNCID-PLMNID' may then be followed.

In an alternative example aspect of the invention, a processor in an AP, such as signal processing module 165 of FIG. 1, may be arranged to calculate and maintain a confidence score for every neighbour (qualified, disqualified or under evaluation). The confidence score takes into account several inputs including the different sources of the neighbours (e.g. manually configured, scanned by NWL, detected by UEs, or scanned by other cells). The confidence score is the key to moving a neighbour between three different classes (qualified, disqualified or under evaluation). The signal processing module 165 may share the confidence score with other APs to improve the utilisation of neighbour info available to an AP when shared with other surrounding APs. The confidence score can be used as the key input to dynamically adjust the maximum neighbour list sizes while maintaining a reliable reduced-size neighbour list.

Potential neighbours are reported to the AP either in the form of scanned NWL neighbours, detected neighbours by the UEs, neighbours of NWL scanned neighbours, or OA&M configured neighbours (in addition to NWL results or when NWL is not available, disabled or failing to find any scanned neighbours).

The potential neighbours may be ranked by signal processing module 165 for evaluation based on a number of available inputs such as: a Number of appearances in scanned neighbours' neighbour lists, appearance in surrounding APs' neighbour lists, a number of UE detected neighbour reports, a source of neighbour (UE reporting, NWL reporting, Surrounding AP reporting, manual configuration), and a probability of macro cell coverage based on extrapolation from other APs measurements.

Different inputs can be provided with different weights by the signal processing module 165 when used for the ranking of potential neighbours. A statistical approach to calculate the probability of a potential neighbour to be a reliable neighbour based on available information can be used. Moreover, filtering can be applied to eliminate potential neighbours that do not meet certain pre-evaluation qualification criteria (e.g. manually configured neighbours that do not appear in any NWL or surrounding AP reports).

Each neighbour may be provided with a confidence score by the signal processing module 165 based on the ranking criteria. The AP maintains the confidence score of every neighbour or potential neighbour in its registry. Confidence scores of the qualified neighbours are updated frequently based on their reliability and can be combined by the signal processing module 165 with some weighting with pre-qualification confidence scores. Surrounding APs can report their neighbour lists with the corresponding confidence score of each neighbour so that the requesting AP can use them in the ranking process.

Based on the confidence score of the potential neighbours in the initial ranking stage, potential neighbours may be categorised by the signal processing module 165 into, say, three classes: (i) Qualified neighbour for inclusion in permanent neighbour list, (ii) Potential neighbour for further UE assessment, (iii) Potentially poor neighbour for immediate elimination.

Class 2 potential neighbours may be subjected to, by the signal processing module 165, a second round of evaluation that uses UE measurements to either increase their confidence scores to qualify as class-1 neighbours or decrease their scores to disqualify as class-3 neighbours.

UEs at cell edge may be configured by the signal processing module 165 to measure class 2 potential neighbours either in a ranked order (e.g. keep including potential neighbours one at a time in UE measurements in a descending order until a neighbour qualifies or disqualifies) or in a random order (e.g. include potential neighbours to UE measurements randomly but with probabilities proportionate to their rank or confidence score).

The signal processing module 165 of the AP may configure the UE to measure more than one potential neighbour at a time if the RF quality is above certain level and/or permanent neighbour list is below certain size, or may choose to not configure a UE with any potential neighbour measurements if the RF quality is below certain level and/or permanent neighbour list is above certain size.

UE measurement reports may be used to update the confidence scores of potential neighbours. Inputs may include one or more of the following: (i) Frequency of appearances in UE measurements, (ii) Frequency of Handover initiation events, (iii) Quality of reported measurements, and (iv) Co-existence with measurements from other cells.

UE measurement reports can also be used to initiate handover to class 2 potential neighbours. The AP may choose to apply different criteria to decide on the handover initiation to class-2 neighbours compared to the criteria used to initiate handover to qualified permanent neighbours.

Statistics of handover initiations and success can also be used by the signal processing module 165 of the AP to update the confidence scores of potential neighbours. Handover success rates at the target cells can also contribute to the confidence score calculation.

As stated earlier, this continues until a class-2 neighbour qualifies as class 1 neighbour or disqualifies as class-3 neighbour. Using a similar method, the confidence score of a class-1 neighbour may decrease gradually or instantaneously to class 2 or class 3. The criteria may include handover failure statistics, NWL scan result changes, or alarms from other surrounding APs or the OAM about changes in the macro cell network configuration.

A class-3 neighbour may also have its confidence score improving up to class 2 based on some criteria such as appearance in detected neighbour UE measurements, NWL scans, neighbours' neighbour lists or surrounding APs' neighbour lists. In addition to dividing neighbour classes based on the neighbours' confidence score, each class can be optionally configured with a maximum limit to optimise the UE measurements and the potential neighbour evaluation processes.

Moreover, a statistical method can be used by the signal processing module 165 to dynamically adjust the maximum limit of each neighbour class based on the confidence score of neighbours in every class and handover success rates to maintain balance between a minimised neighbour list size and high probability of successful handover.

Figure 9:
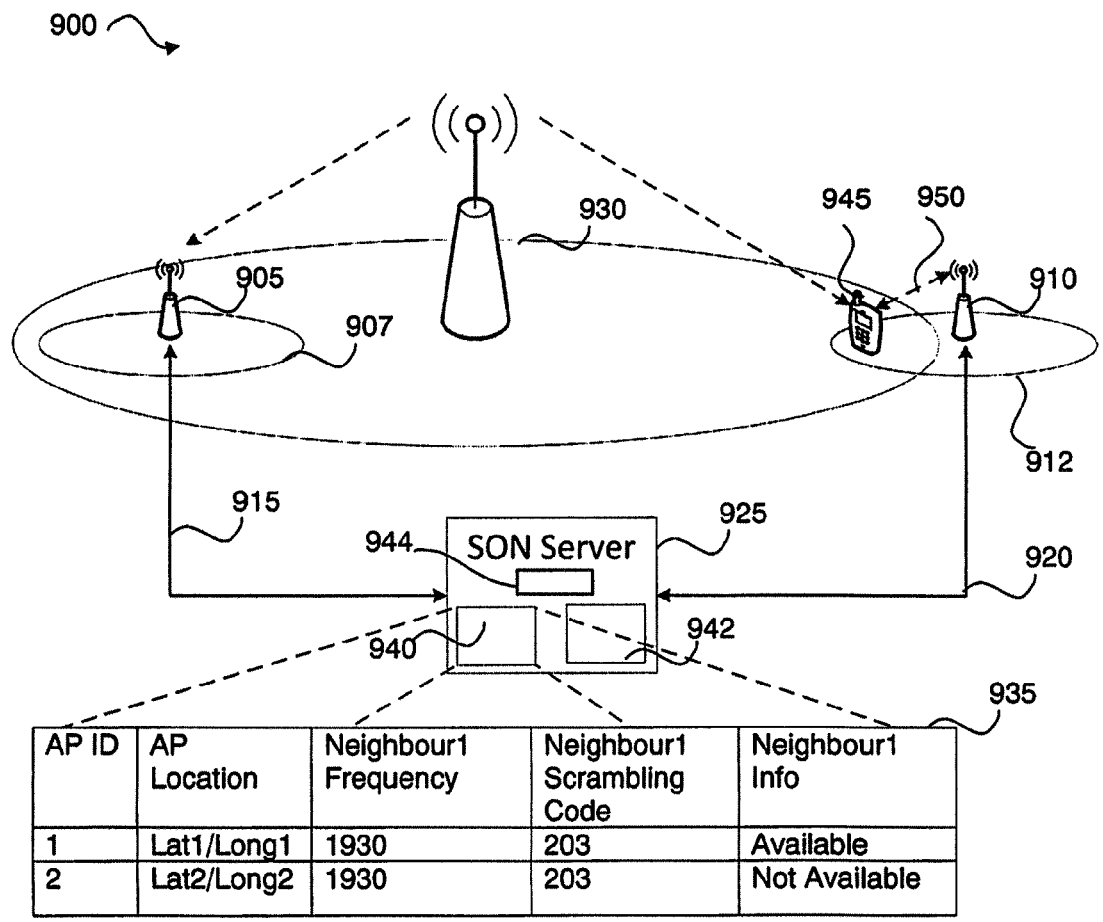
FIG. 9 illustrates one further example SON Server lookup mechanism.

Referring now to FIG. 9, a further example architecture 900 embodying a SON Server lookup mechanism is illustrated. The further example architecture 900 assumes that at least first and second APs 905, 910 report some information in 915, 920, directly or indirectly, to a SON server 925. In some examples, the information reporting 915, 920 may initially take place when the first and second APs 905, 910 are first commissioned and may subsequently be updated periodically or on demand. The information reported to the SON server 925 may include, for example, the AP's identities, one or more of the AP's absolute or relative location, configured and detected neighbours, etc.

In the illustrated example, the coverage areas 907, 912 of both AP1 and AP2 905, 910 overlap with the coverage area 930 of the macrocell. In one example, a Network Listen/Sniffer receiver (not shown) of the first AP 905 may receive a direct signal from the macrocell 930 and it may therefore decode the cell information broadcasted by the macrocell 930 and may subsequently add the macrocell to its neighbour list. The first AP 905 may report its discovered and configured neighbour to the management system as well as to the SON server 925.

In one example, the SON server 925 may store in memory 944 the details of the macrocell 930 (for example in the table 935, referred to as Neighbour1) in a database 940. However, due to the location of the second AP 910, second AP's Network Listen/Sniffing receiver may not receive a direct signal from the macrocell 930. The UEs (e.g. UE 945) served by the APs may be configured to report measurements 950 from detected neighbour cells that are not configured as neighbours to the second AP 910 using, say, a standard 3GPP RRC message. If this is enabled, a UE connected to the second AP 910 and located in the overlap area between the second AP 910 and the macrocell 930 may be configured to report measurements from the detected macrocell 930 to the second AP 910. The detected macrocell will be identified in the report using only its frequency and scrambling code (in the case of a 3G UTRAN cell). This information may not be sufficient for the second AP 910 to add the macrocell as a handover neighbour. However, the second AP 910 may report the detected macrocell neighbour to the SON server 925.

In some examples, the SON server's processing unit 942 may then use certain criteria to locate the missing information of the detected neighbour and report it back to the second AP 910. In the illustrated example, the SON server 925 may at least use the location information stored about both the first AP 905 and the second AP 910 to decide that due to, for example, the closeness of the first AP 905 with the second AP 910. It is likely that if both APs 905, 910 report a neighbour of the same frequency and scrambling code combination, they are referring to the same neighbour cell. Based on this decision the SON Server 925 may use the information reported by the first AP 905 about the macrocell Neighbour) to provide the second AP 910 with the missing information about the detected macrocell neighbour, so that the second AP 910 may be able to configure the macrocell 930 as a handover neighbour.

Figure 10:
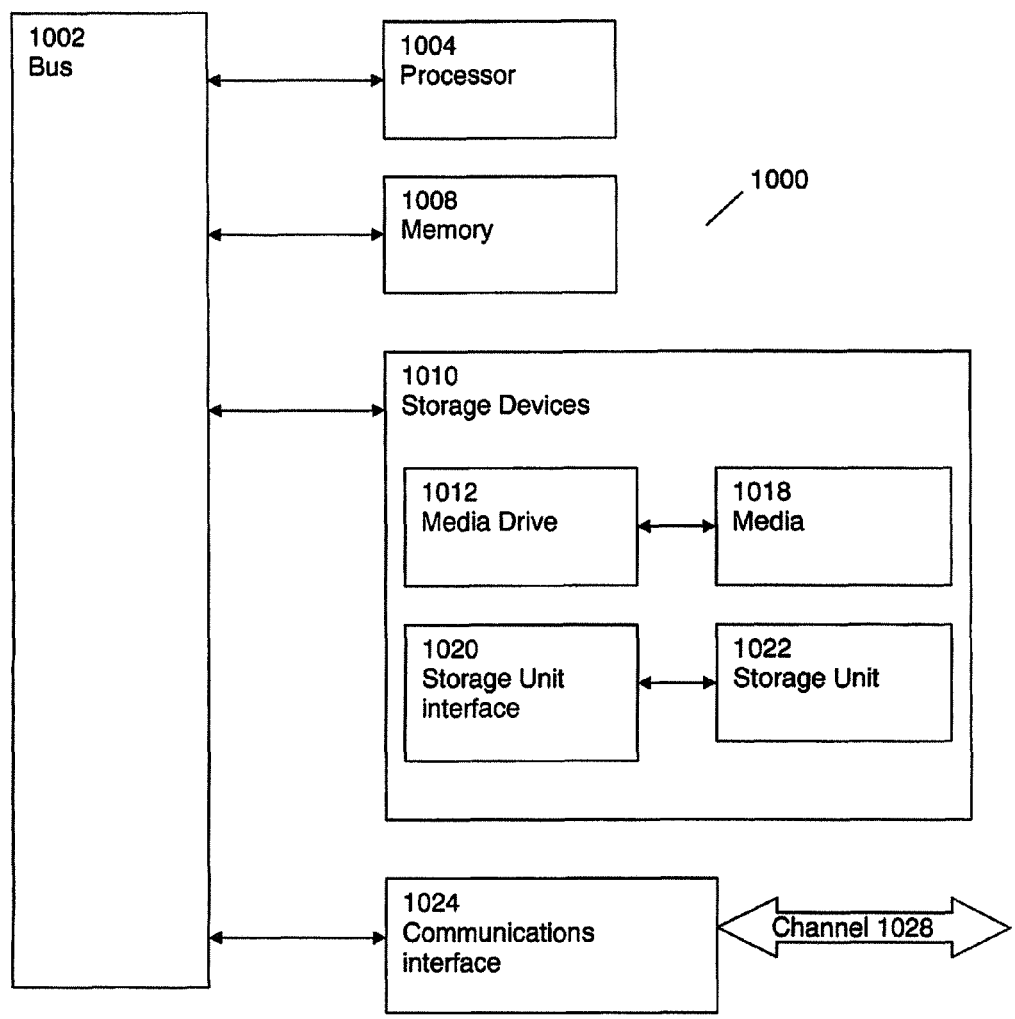
FIG. 10 illustrates a typical computing system that may be employed to implement signal processing functionality in example embodiments.

Referring now to FIG. 10, there is illustrated a typical computing system 1000 that may be employed to implement signal processing functionality in embodiments of the invention. Computing systems of this type may be used in access points (HNBs), base transceiver stations and wireless communication units. Those skilled in the relevant art will also recognize how to implement the invention using other computer systems or architectures. Computing system 1000 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1000 can include one or more processors, such as a processor 1004. Processor 1004 can be implemented using a general or special-purpose processing engine such as, for example, a microprocessor, microcontroller or other control module. In this example, processor 1004 is connected to a bus 1002 or other communications medium.

Computing system 1000 can also include a main memory 1008, such as random access memory (RAM) or other dynamic memory, for storing information and instructions to be executed by processor 1004. Main memory 1008 also may be used for storing temporary variables or other intermediate information during execution of instructions to be executed by processor 1004. Computing system 1000 may likewise include a read only memory (ROM) or other static storage device coupled to bus 1002 for storing static information and instructions for processor 1004.

The computing system 1000 may also include information storage system 1010, which may include, for example, a media drive 1012 and a removable storage interface 1020. The media drive 1012 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1018 may include, for example, a hard disk, floppy disk, magnetic tape, optical disk, CD or DVD, or other fixed or removable medium that is read by and written to by media drive 1012. As these examples illustrate, the storage media 1018 may include a computer-readable storage medium having particular computer software or data stored therein.

In alternative embodiments, information storage system 1010 may include other similar components for allowing computer programs or other instructions or data to be loaded into computing system 1000. Such components may include, for example, a removable storage unit 1022 and an interface 1020, such as a program cartridge and cartridge interface, a removable memory (for example, a flash memory or other removable memory module) and memory slot, and other removable storage units 1022 and interfaces 1020 that allow software and data to be transferred from the removable storage unit 1018 to computing system 1000.

Computing system 1000 can also include a communications interface 1024. Communications interface 1024 can be used to allow software and data to be transferred between computing system 1000 and external devices. Examples of communications interface 1024 can include a modem, a network interface (such as an Ethernet or other NIC card), a communications port (such as for example, a universal serial bus (USB) port), a PCMCIA slot and card, etc. Software and data transferred via communications interface 1024 are in the form of signals which can be electronic, electromagnetic, and optical or other signals capable of being received by communications interface 1024. These signals are provided to communications interface 1024 via a channel 1028. This channel 1028 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to tangible media such as, for example, memory 1008, storage device 1018, or storage unit 1022. These and other forms of computer-readable media may store one or more instructions for use by processor 1004, to cause the processor to perform specified operations. Such instructions, generally referred to as 'computer program code' (which may be grouped in the form of computer programs or other groupings), when executed, enable the computing system 1000 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1000 using, for example, removable storage drive 1022, drive 1012 or communications interface 1024. The control module (in this example, software instructions or executable computer program code), when executed by the processor 1004, causes the processor 1004 to perform the functions of the invention as described herein.

In summary, a network element (such as a SON server) is described for use in a wireless communication system that supports a plurality of access points providing communication in small cells. The network element comprises a signal processor arranged to: receive and process information from a plurality of access points wherein the received information identifies a macro cell visible to a respective access point; and calculate a degree of correlation of the information from the at least two access points based at least partly on the processed macro cell information provided by the respective access point. In some examples, an integrated circuit may comprise the signal processor.

In some examples, a method is described for correlating information for a network element (such as a SON server) employed in a wireless communication system that supports a plurality of access points providing communication in small cells. The method comprises: receiving and processing information from a plurality of access points; identifying from the received information a macro cell that is visible to a respective access point; and calculating a degree of correlation of the information from the at least two access points based at least partly on the processed macro cell information provided by the respective access point.

In some examples, an access point providing communication in small cells in a wireless communication system is described. The access point comprises a transmitter operably coupled to a signal processor arranged to: transmit information to a network element wherein the information identifies at least one macro cell visible to a respective access point; transmit a request to the network element that stores a plurality of access point information, wherein the request is for a list of neighbouring cells of a second correlated access point; receive and process the list of neighbouring cells of the second correlated access point; and update the access point's neighbour cell list in response to the list of neighbouring cells of the second correlated access point. In some examples, an integrated circuit may comprise the signal processor.

In some examples, a method is described for updating a neighbour list at an access point supporting small cells in a wireless communication system. The method comprises: transmitting information to a network element wherein the information identifies at least one macro cell visible to a respective access point; transmitting a request to the network element that stores a plurality of access point information, wherein the request is for a list of neighbouring cells of a second correlated access point; receiving and processing the list of neighbouring cells of the second correlated access point; and updating the access point's neighbour cell list in response to the list of neighbouring cells of the second correlated access point.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other subsystem element.

It will be appreciated that, for clarity purposes, the above description has described embodiments of the invention with reference to a single signal processing module. However, the inventive concept may equally be implemented by way of a plurality of different functional units and processors to provide the signal processing functionality. Accordingly, it will be understood that the term 'signal processing module' used herein is intended to encompass one or more signal processing functional units, circuits and/or processors. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, an improved network element, integrated circuit and method to identify correlation between small cells and re-use shared information for parameter configuration, performance monitoring and/or network optimisation within a cellular communication system have been described, wherein the aforementioned disadvantages with prior art arrangements have been substantially alleviated.erally

We claim:

1. A network element for a wireless communication system that comprises a plurality of small cells supported by a respective access point and at least one macrocell, wherein the network element comprises a signal processor arranged to:

receive from a plurality of access points, received information relating to parameters of one or more cells comprising the wireless communication system and which includes information identifying a macro cell visible to a respective access point;

access stored information from a database, said stored information being provided by at least one access point, calculate a degree of correlation of information received from at least two access points by calculating a degree of correlation existing between information received from a first access point and stored information provided by at least a second access point, and depending on the degree of correlation, generate transmit information relating to operating parameters of a cell comprising said wireless communication system and transmitting the transmit information to a wireless communication system element.

2. The network element of claim 1 wherein the received macro cell information comprises information obtained by a wireless subscriber unit supported by the respective access point.

3. The network element of claim 1 wherein the calculation of a degree of correlation of the information from the at least two access points comprises the signal processor being arranged to compare one or more identifier matches between the plurality of access points.

4. The network element of claim 3 wherein the one or more identifier matches comprise at least one from a group comprising: a cell identifier, a radio network controller identifier, a public land mobile network identifier.

5. The network element of claim 1 wherein the calculation of a degree of correlation of the information from the at least two access points is based at least partly on a determination of a number of overlapping macro cells between the plurality of access points as well a strength of radio frequency signals reported by the plurality of access points.

6. The network element of claim 1 wherein the calculation of a degree of correlation of the information from the at least two access points is based at least partly on a determination of a location of the plurality of access points.

7. The network element of claim 6 wherein the received information comprises at least one radio frequency measurement value that identifies whether an access point is located at a cell edge of the macro cell.

8. The network element of claim 1 wherein the calculation of a degree of correlation of the information from the at least two access points is based at least partly on a weighting factor applied to the received information from the plurality of access points.

9. The network element of claim 1 wherein the signal processor uses the received macro cell information to build a coverage map of detected neighbour macro cells for adding to at least one access point's neighbour list.

10. The network element of claim 1 wherein the received information is provided to the network element following at least one from a group comprising: upon installation of an access point, following a request for the received information from the network element, periodically, following a change in a system information broadcast message transmitted by a macro cell.

11. The network element of claim 1 wherein the received information comprises at least one from a group comprising: PLMN ID (Public Land Mobile Network Identity), CellId (Cell identity), RNCID, (Radio Network Controller Identity), Frequency, Scrambling code, CPICH RSCP (Common Pilot Channel Received Signal Code Power), CPICH EcNo (Common Pilot Channel received energy per chip to noise power spectral density ratio).

12. The network element of claim 1 further comprising a transmitter operably coupled to the signal processor, wherein the signal processor is arranged to inform at least one access point from the plurality of access points based at least partly on a determined change in one or more performance metrics of the macro cell.

13. The network element of claim 1 wherein the calculation of a degree of correlation of the information from the at least two access points comprises at least one of:

performing a multiple level categorisation of access point classes, generating a confidence level associated with the respective access point.

14. The network element of claim 1 wherein the network element is a self-organising network (SON) server, for example located behind or within a TR69 standard ACS (Autoconfiguration Server) provisioning module.

15. An integrated circuit for a network element employed in a wireless communication system, that comprises a plurality of small cells supported by a respective access point and at least one macrocell, wherein the integrated circuit comprises a signal processor arranged to:

receive from a plurality of access points, received information relating to parameters of one or more cells comprising the wireless communication system and which includes information identifying a macro cell visible to a respective access point;

access stored information from a database, said stored information being provided byr at least one access point, calculate a degree of correlation of information from at least two access points by calculating a degree of correlation existing between received information from a first access point and stored information provided by at least a second access point, and depending on the degree of correlation, generate transmit information relating to operating parameters of a cell comprising said wireless communication system and transmitting the transmit information to a wireless communication system element.

16. A method for correlating information for a network element employed in a wireless communication system that comprises a plurality of small cells supported by a respective access point and at least one macrocell, wherein the method comprises:

receiving from a plurality of access points, received information relating to parameters of one or more cells comprising the wireless communication system and which includes information identifying a macro cell that is visible to a respective access point;

accessing stored information from a database, said stored information being provided by at least one access point, calculating a degree of correlation of information from at least two access points by calculating a degree of correlation existing between received information from a first access point and stored information provided by at least the second access point and depending on the degree of correlation, generating transmit information relating to operating parameters of a cell comprising said wireless communication system and transmitting the transmit information to a wireless communication system element.

17. An access point providing communication in small cells in a wireless communication system, wherein the access point comprises a transmitter operably coupled to a signal processor and arranged to:

transmit information to a network element wherein the information identifies at least one macro cell visible to the access point;

transmit a request to the network element that stores a plurality of access point information for correlation with the information transmitted by the access point and wherein the request is for a list of neighbouring cells of a correlated access point;

receive and process the requested list of neighbouring cells of the correlated access point; and update the access point's neighbour cell list in response to the received list of neighbouring cells of the correlated access point.

18. An integrated circuit for an access point providing communication in small cells in a wireless communication system, wherein the integrated circuit comprises a signal processor arranged to:

transmit information to a network element wherein the information identifies at least one macro cell visible to the access point;

transmit a request to the network element that stores a plurality of access point information for correlation with the information transmitted by the access point and wherein the request is for a list of neighbouring cells of a correlated access point;

receive and process the received list of neighbouring cells of the correlated access point; and update the access point's neighbour cell list in response to the list of neighbouring cells of the correlated access point.

19. A method for updating a neighbour list at an access point supporting small cells in a wireless communication system, wherein the method comprises:

transmitting information to a network element wherein the information identifies at least one macro cell visible to the access point;

transmitting a request to the network element that stores a plurality of access point information for correlation with the transmitted information provided by the access point and wherein the request is for a list of neighbouring cells of a correlated access point;

receiving and processing the received list of neighbouring cells of the correlated access point; and updating the access point's neighbour cell list in response to the list of neighbouring cells of the correlated access point.

* * * * *

UNITED STATES PATENT AND TRADEMARK OFFICE
CERTIFICATE OF CORRECTION

PATENT NO. : 8,996,014 B2  
APPLICATION NO. : 13/743803  
DATED : March 31, 2015  
INVENTOR(S) : Akram Jamal Masoud Awad et al.

It is certified that error appears in the above-identified patent and that said Letters Patent is hereby corrected as shown below:

ON THE TITLE PAGE:

Item (72) Inventors: Change "Harrow James Edward Brereton" to -- James Edward Brereton Harrow --;

IN THE CLAIMS:

Column 19, Claim 11, Line 63; change "RNCID," to -- RNCID --;

Column 20, Claim 14, Lines 15-16; change "(Autoconfiguration" to -- (Auto configuration --;

Column 20, Claim 15, Line 28; change "byr" to -- by --; and

Column 20, Claim 16, Line 55; change "point" to -- point, --.

Signed and Sealed this  
First Day of December, 2015

Michelle K. Lee  
*Director of the United States Patent and Trademark Office*